Figure 3:
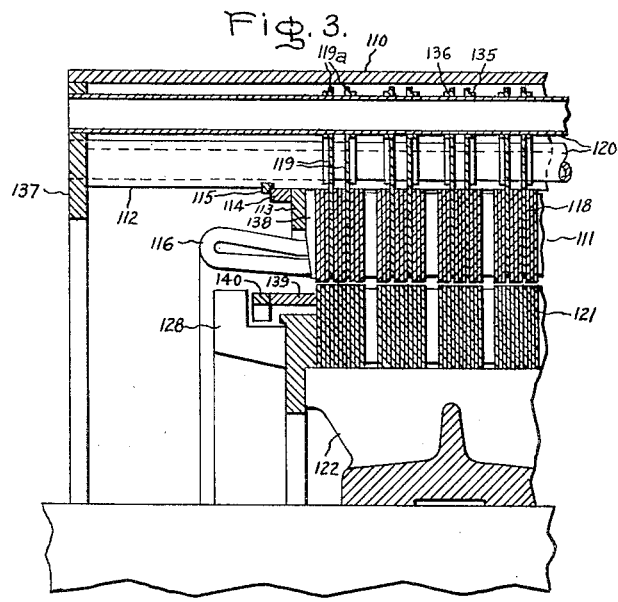

Jan. 2, 1951 C. J. KOCH 2,536,815
DYNAMOELECTRIC MACHINE
Filed Dec. 14, 1949 2 Sheets-Sheet 1
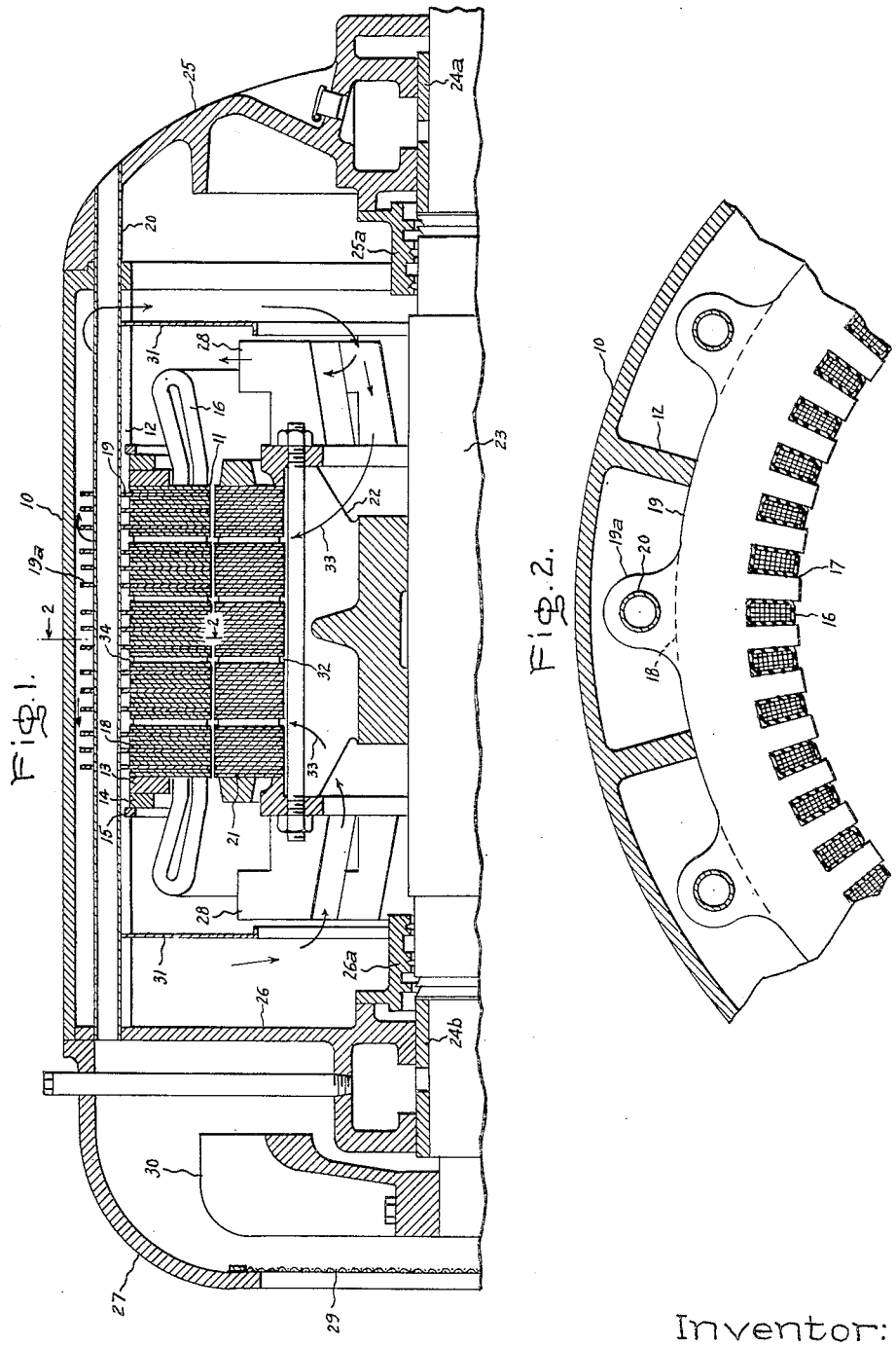
Inventor:
Charles J. Koch,
by Ernest C. Britton
His Attorney.

Jan. 2, 1951 C. J. KOCH 2,536,815
DYNAMOELECTRIC MACHINE
Filed Dec. 14, 1949 2 Sheets-Sheet 2

Inventor:
Charles J. Koch,
by Ernest H. Britton
His Attorney.

Patented Jan. 2, 1951

2,536,815

UNITED STATES PATENT OFFICE 2,536,815

DYNAMOELECTRIC MACHINE

Charles J. Koch, Schenectady, N. Y., assignor to General Electric Company, a corporation of New York Application December 14, 1949, Serial No. 132,886

8 Claims. (Cl. 171—252)

My invention relates to dynamoelectric machines and has particular significance in connection with large size motors of totally inclosed fan-cooled construction.

It is only very recently that there has been interest expressed in building totally inclosed fan-cooled constructions in the larger sizes, e. g. above 300 H. P. The problem of dissipating heat generated in a totally inclosed fan-cooled motor becomes more acute as these larger sizes are contemplated and the simple constructions used in small motors and generators are not generally suited to the problems arising in connection with the design of larger machines, because the output and losses of a motor increases roughly as the cube of a dimension, whereas the surface increases only as the square of the dimension.

As is well-known, the totally inclosed fan-cooled construction is generally one wherein there is circulation of an inner cooling medium and also circulation of outer air in heat conducting relationship with said inner medium. In getting the heat out of the machine the external air should not pass directly over the inner machine parts, such as stator core laminations, since the air may be corrosive or the laminations may leak, permitting moisture or chemicals carried by the external air to penetrate into the machine windings.

It is an object of the present invention to provide more effective cooling means for large totally inclosed fan-cooled motors.

A further object of the present invention is to provide an improved cooling system for such a machine whereby efficient cooling may be obtained without the admission of air from the exterior to the inclosed working parts.

In the illustrated embodiment of my invention, I provide a series of radial ventilating ducts which are arranged to carry away the heat which is generated in laminated rotor and stator cores. External air is circulated through thin walled tubes which extend transverse to the flow of ventilating medium from said ducts. In accordance with the invention, I further provide for heat conduction from the stator core metallically to the surfaces (of the tubes) over which the external air is passing by the use of copper laminations which project beyond the outside diameter of the main body of the stator core and are attached to the tubes through which this external air flows. In this way direct conduction of heat from the stator lamination stack to external cooling air is effected without having the cooling air in direct contact with the laminations.

Further objects will become apparent and my invention will be better understood from consideration of the following description taken in connection with the accompanying drawing in which Fig. 1 is a longitudinal sectional view of one-half of a motor embodying my system of ventilation; Fig. 2 is a view of the stator core and outer frame taken on the line 2—2 of Fig. 1; Fig. 3 is a partial longitudinal sectional view of a different motor embodying my system of ventilation in a modified form; and Fig. 4 is an end view of the construction shown in Fig. 3.

Referring now to Figs. 1 and 2, I have shown an electric motor comprising an annular main inclosing and supporting frame 10, in which is disposed a laminated stator core 11 supported from frame 10 by means of a plurality of axially extending rib members 12 (Fig. 2) formed integral with frame 10 and secured to the stator laminations in any convenient manner. The stator 11 is clamped together by means of clamping flanges 13 and 14 (Fig. 1) held in place by a plurality of keys 15 secured in keyways located in the rib members 12. The stator 11 has a winding 16 disposed in conventional axially extending slots 17 transversing the laminated core. The laminae of core 12 comprises a plurality of the usual laminations or punchings 18 of magnetic material (such as steel) and also plates 19 of non-magnetic good heat conductive material (such as copper). The plates 19 are inter-leaved between groups of magnetic laminations 18, as shown in Fig. 1, and portions 19a of the copper plates 19 extend considerably beyond the outer periphery of the magnetic laminae 18 which make up the main body of the stator core. These extensions act as heat radiating and conducting elements and are arranged to surround and contact a plurality of thin walled external coolant conducting tubes 20 as hereinafter more fully explained.

Arranged in cooperative relationship with stator 11 is a squirrel cage rotor member 21 secured as by a spider 22 to a shaft 23, the shaft being supported by suitable bearings 24a and 24b. The main inclosing housing or case for the motor of Fig. 1 comprises the frame 10, an end housing 25 (which houses the bearing 24a), and an end housing which includes both an inner plate 26 (which houses the bearing 24b) and an outer end inclosure 27. The end housing 25 and the inner plate 26 are provided with shaft seals (25a and 26a) which effectively seal the inner coolant (presumably air) which is adapted to be circulated by fans 28 which rotate with spider 22. External coolant, such as room air, is drawn into the machine through a screened opening 29 in outer inclosure 27, and blown through the tubes 20 by a fan 30 secured to rotate with shaft 23. In operation, external air is drawn through screen 29 and exhausted completely through the machine to the other end thereof through conduits 26. Meanwhile the inner cooling medium is circulated not only by fans 28 over and around stationary shrouds or baffles 31 secured as to ribs 12 adjacent each fan 28 but through parallel paths by the flowing effect of conventional radial ducts 32 of rotor 21 as indicated by arrows 33 and through radial ducts 34 of stator 11 radially outward and between the ribs 12 (see Fig. 2) around the cooling tubes 20. At the same time, heat is metallically conducted from the stator laminations outward through the copper plates 19 and then, by a direct metallic connection, to the cooling tubes 20 and thus to the external air flow. In order to not interfere with the supporting function of ribs 12 or with the free flow of internal cooling medium between the ribs, I have shown the projections 19a of each copper lamination 19 as a plurality of circumferentially spaced bulbous portions each surrounding one of the tubes 20. At the points where the tubes 20 pass through these bulbous extensions 19a of the copper laminations, it is desirable to have a very good metallic contact and this can be achieved by expanding each tube during assembly as by the introduction of oil at high pressure within the tubes thereby causing them to fit tightly against the lamination extension inner peripheries.

Figure 4:
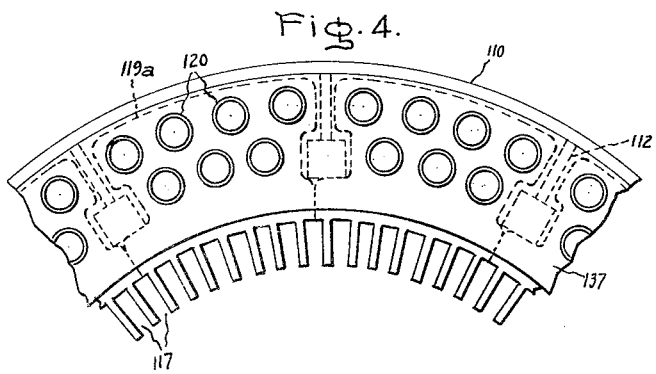

For very large machines it is often preferable to break up the stator punchings into a plurality of arcuate assemblies and in Figs. 3 and 4, I have shown such a construction with frame 110, stator 111, ribs 112, end flanges 113, retaining rings 114, keys 115, stator winding 116 (Fig. 3) in slots 117 (Fig. 4) arcuate (rather than annular) stator magnetic material laminations 118, arcuate heat conductive material plates 119 with a plurality of seven tubes 120 piercing each such plate 119 located between each set of adjacent ribs 112 so that the plate bulbous extensions or fins 119a each surround seven tubes. Furthermore, in Figs. 3 and 4, the holes provided in each heat conductive or copper plate 119 to accommodate the tubes 120 are knocked out in such a manner that the plate is flanged or turned back as indicated at 135 and 136 to increase the surface of the mating contact between the tubes 120 and the heat conducting plate extensions. Then, when a tube is expanded, it will fit tightly against the plate over a relatively large contact surface provided by the flange to afford very good thermal contact.

In Figs. 3 and 4 the motor outer shell 110 supports the stator 111 by means of the ribs 112 and an end header 137 is used to support the tubes 120. Keys 115 located in the ribs 112 lock retaining rings 114 securely against end flanges 113 which in turn bear against fingers 138 which are interposed between the turns of coil 116 to secure the stator laminations (practically to their tips) against misalignment due to vibration. The rotor 121 (shown only in Fig. 3) comprises a spider 122, fan blades 128, and rotor bars 139 short circuited together at their ends by end rings 140.

In all the figures of the drawing the heat conductive plates project beyond the outside diameter of the stator core to provide for metallic conduction of heat from the stator core to the surface of the tubes 20 through which the external air is passing, so that the dynamoelectric machine is cooled by this direct metallic conduction through the heat conductive plates as well as by the cooling effect of the internal medium passing over the tubes, while the external air is not allowed to contact the laminations or any internal parts of the machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a laminated stator, a rotor, a housing totally inclosing said stator and rotor, a plurality of thin walled conduits axially extending through a portion of said housing, a plurality of plates of heat conductive material interposed between laminations of said stator, said plates having perforations with said conduits extending through said perforations with a tight metallic conduction fit between plates and conduits, and means for propelling external cooling medium through said tubes and out of said machine, whereby heat generated in said stator is adapted to be metallically conducted to said tubes and from said tubes to said external medium.

2. A dynamoelectric machine having a stator core comprising laminations of magnetic material, a rotor core disposed within said stator core, a shaft operatively associated with said rotor core, a plurality of axially extending tubes surrounding the main body of said stator laminations, a plurality of plates extending within and beyond said main body and surrounding each of said tubes in good heat conducting relation, an outer inclosure for said machine, fan means operatively associated with said shaft and for circulating internal ventilating medium around said tubes, and fan means operatively associated with said shaft for circulating external air into portion of said machine through said tubes and out of said machine, whereby said external air may be prevented from contacting said laminations.

3. A dynamoelectric machine comprising a laminated stator core, a rotor core disposed within said stator core, spaced hollow cylindrical metallic members disposed around the outside of said stator core, an inner housing comprising end members enclosing the ends of said stator with said cylindrical member adapted to provide axial channels extending through and between said end members, an outer casing comprising a shell arranged around said cylindrical members and at least one additional or outer end member, said stator core comprising laminations of magnetic material and added plates of higher heat conductive material interposed between said laminations at spaced intervals and extending beyond the periphery thereof, means including a metal to metal contact between each of said plates of heat conducting material and each of said cylindrical members for transferring heat from said stator core to said cylindrical members, and means for forcing coolant through said cylindrical member.

4. In an electric machine, the combination of a stator core comprising laminations of magnetic material and interposed plates of copper, an air circulating case over said stator core, axially extending ribs adapted to join said case and said core to support said core and form ventilating passages thereabout, an end bracket for one end of said case and comprising an outer wall and an inner wall, a second end bracket for the opposite end of said case, a plurality of tubes axially extending from said inner wall to said second end bracket and discharging thereat to atmosphere, fan means located between said outer wall and said inner wall and adapted to draw external air through said outer wall and discharge said air through said tubes, with said copper plates arranged to surround each of said tubes and contact said tubes in good heat conducting relationship.

5. In a dynamoelectric machine, the combination of a stator core comprising groups of laminations of magnetic material and interposed plates of high heat conductive material, a casing inclosing said machine with a space between said casing and said stator core, outwardly extending ventilating passages through said stator core, fan means adjacent one end of said core for circulating internal ventilating medium through said ventilating passages and into the space between said casing and said core, a plurality of thin walled tubes axially disposed in said space for means adjacent one end of said casing for circulating external air through said tubes, and means including a mechanical connection between each of said tubes and an adjacent flange on each of said plates of high heat conductivity material for transferring heat from plates to tubes.

6. In a dynamoelectric machine, the combination of a stator core comprising an annular assembly of arcuate punchings of magnetic material and axially interposed arcuate plates of copper, an air circulating case over said stator core and radially spaced therefrom, axially extending ribs connecting case and core and defining axially extending ventilating passages therebetween, a plurality of thin walled tubes axially extending through said ventilating passages with each of said plates of copper extending into at least one of said ventilating passages and perforated thereat to receive and surround each of said plurality of tubes therein, fan means for circulating internal ventilating medium around said tubes, and fan means for circulating external air through said tubes.

7. In a dynamoelectric machine, the combination with a stationary member provided with first laminations of magnetic material, of second laminations of heat conducting material interposed at axially spaced intervals between pluralities of said first laminations and extending beyond the outer dimensions thereof, a casing for inclosing said stationary member and comprising end members, and a plurality of axial ducts for the circulation of coolant substantially external to said machine, with each of said ducts journaled in each of said end plates and journaled in at least some of said second laminations.

8. In a dynamoelectric machine, the combination of a stator comprising a plurality of punchings, a cage forming at least one ventilating passage around said stator, plates of a material of high heat conductivity disposed between said punchings and projecting radially therebeyond and into said passage; tubes axially extending through said passage and journaled in said plates circumferentially around the outside of said punchings with each journal including a flanged back portion of the associated plate intimately contacting the associated tube, and means for circulating a cooling medium through said tubes.

CHARLES J. KOCH.

REFERENCES CITED

The following references are of record in the file of this patent:

UNITED STATES PATENTS

| Number | Name | Date |
|---|---|---|
| 1,453,159 | Mossay | Apr. 24, 1923 |
| 1,681,780 | Pensabene | Aug. 21, 1928 |
| 1,686,027 | Newbury | Oct. 2, 1928 |
| 1,794,029 | Pfleger | Feb. 24, 1931 |
| 1,852,476 | Pfleger | Apr. 5, 1932 |

FOREIGN PATENTS

| Number | Country | Date |
|---|---|---|
| 214,944 | Great Britain | Aug. 21, 1924 |
| 446,921 | France | Oct. 14, 1912 |
| 433,209 | Germany | Aug. 24, 1926 |